W. H. JONES.
ROTARY WOODWORKING CUTTER.
APPLICATION FILED NOV. 24, 1920.
1,438,651.
Patented Dec. 12, 1922.
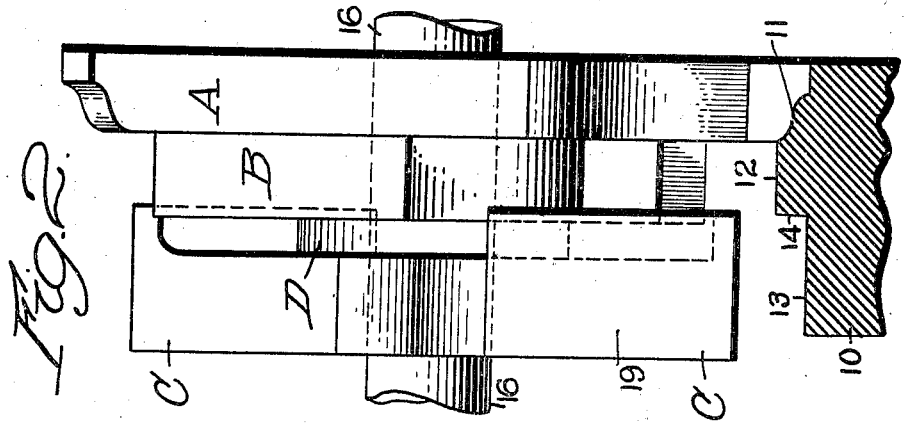
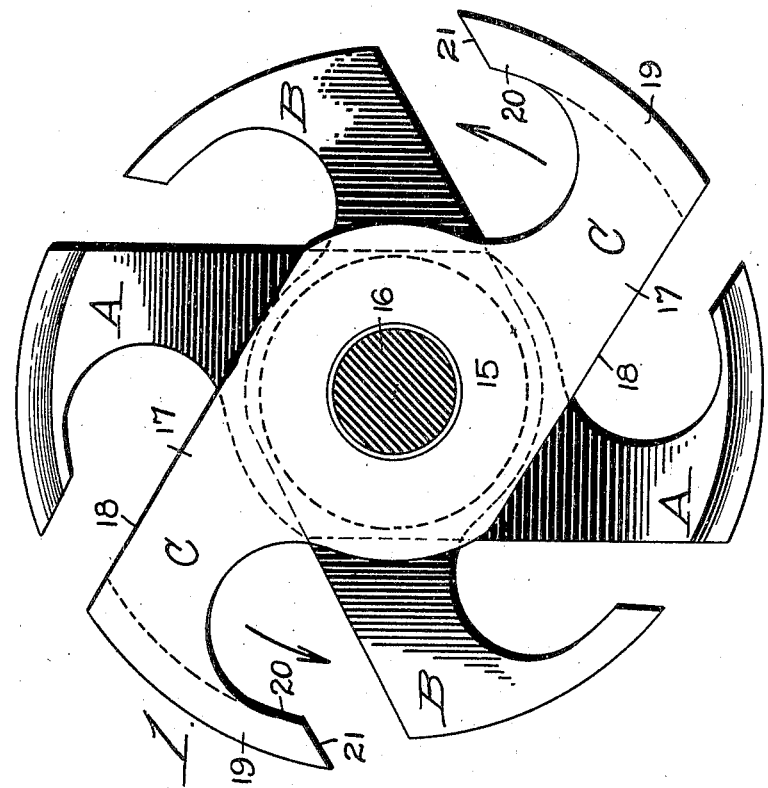

Patented Dec. 12, 1922.

1,438,651

UNITED STATES PATENT OFFICE.

WILLIAM H. JONES, OF WORCESTER, MASSACHUSETTS.

ROTARY WOODWORKING CUTTER.

Application filed November 24, 1920. Serial No. 426,266.

*To all whom it may concern:*

Be it known that I, WILLIAM H. JONES, a citizen of the United States, residing at Worcester, in the county of Worcester and State of Massachusetts, have invented a new and useful Rotary Woodworking Cutter, of which the following is a specification.

This invention relates to an improvement on the usual profiling cutter employed with wood working machinery for the purpose of forming the edges of sashes, blinds, doors, mouldings, and the like.

The principal objects of this invention are to provide an improved cutter in which each separate part of the moulding will be cut by a separate double ended blade; independent of the others and adjustable along the shaft or spindle on which they are mounted, so as to vary the shape of the moulding merely by this adjustment and in which each blade and the whole series of blades will be perfectly balanced, thus eliminating a large part of the vibration and noise; and also admitting of a very high rate of speed; and especially to provide a construction in which the sharpening of the blades can be performed on an ordinary stone by unskilled workmen without affecting the shape of the cut to be made and without removing or changing the position of the cutters.

Further objects and advantages of the invention will appear hereinafter.

Reference is to be had to the accompanying drawings, in which

Fig. 1 is a side elevation of a set of cutters constructed in accordance with this invention, and Fig. 2 is an end elevation of the same showing the work in cross section.

I have shown the invention as applied to the manufacture of a moulding 10 having a curved surface 11, a flat surface 12, and a depressed flat surface 13 connected with the surface 12 along a vertical plane 14. This form of moulding therefore really involves three edge surfaces 11, 12 and 13. Therefore I use three cutters A, B, and C. Each of these cutters has substantially the same characteristics, and I will describe in detail the cutter C. This has a hub 15 provided with a perforation for the reception of the shaft or spindle 16 on which it is mounted and to which it is keyed or otherwise fixed.

Extending from this hub in opposite directions parallel with each other and spaced apart are two integral arms 17. In the form shown, the rear surface 18 of each of these arms is straight and substantially tangential to the hub. The forward surface is shown as concave. At the end of each arm there is an arcuate portion 19 which constitutes an integral forwardly extending cutting jaw. On its outer surface it is substantially concentric with the shaft 16, but relieved slightly, its highest point being at the forward end. This outer surface is either straight across as in the case of the two blades B and C, or curved as in the case of the blade A. This is arranged in accordance with the work to be performed.

The concave side of the arm 17 terminates in a surface 20 which is concentric with the external surface for a distance. These two surfaces are connected by a flat surface 21. This is on the inner side of the arm, and on its forward edge. It is inclined, and therefore produces a sharp angle at its outer end. This constitutes the cutting edge, which is sharpened by placing this surface 21 against a flat sharpening surface or a large cylindrical one.

It is to be observed that the external surface of the blade is of the same shape throughout all its length and that that is the shape which it is desired to have it form on the work. It follows from this that when worn away by sharpening, its cutting shape will continue the same always. By sharpening it on a transverse flat surface 21 it will be clear that any ordinary workman can perform this operation, and the cutter will cut accurately thereafter, thus doing away with the necessity for having an expert to sharpen the blade. The blades, all being of symmetrical shape with respect to a central point, are perfectly balanced, thus doing away with the vibration which would otherwise be set up. Each blade performs only a part of the entire cutting operation, so less power is required and less noise made. The blades are also located angularly on the shaft with respect to each other, so that there is practically always a blade in cutting position, which also helps to eliminate the vibration. This permits of very high speed with perfect safety. By spacing the blades in this way and shaping them as shown and described, each blade has, opposite the surface that has to be ground, a space into which a sharpening stone can be inserted for sharpening it without removing or adjusting any of the six blades.

One of the blades, as for example C, which cuts deeper into the work than the next one B, overlaps its path. These two blades are set at an angle as stated. The cutting surface of the blade C can overlap the path of the cutting surface of the blade B. Therefore the width of the surface 12 on the work can be varied materially by spacing these two blades B and C apart the desired distance by means of a washer D. Two or three washers may be provided of different widths. Each of them controls the width of the surface 12. The width of the surface 13 is controlled by the relative location of the entire cutter to the work 10. Very often it projects beyond the edge of the work as indicated. By the simple means of providing this overlap and the adjustment by means of the washers, important variation can be made in the moulding produced without interchanging the cutters or even dismounting them from the shaft on which they are located.

It will be understood that this invention is adapted for making an indefinite number of shapes, and that I have illustrated only one of them. It is intended principally for cutting or profiling sashes, door-frames, blinds, interior finish, and mouldings of various character.

Although I have illustrated and described only a single form of the invention I am aware of the fact that many modifications can be made therein by any person skilled in the art without departing from the scope of the invention as expressed in the claim. Therefore I do not wish to be limited to all the details of construction and relative arrangements of parts herein shown and described, but what I do claim is:—

In a wood working cutter the combination of three blades, each blade consisting of a hub adapted to be fixed on a spindle and provided with two equally balanced integral straight arms extending from opposite sides in parallel relationship and spaced from the shaft equally and oppositely, each having an integral forwardly extending arcuate cutting jaw thereon having an external surface, both of said external surfaces being concentric but slightly relieved and shaped to produce the desired cut, and an inner surface concentric with the shaft, and a projecting inclined forward end surface substantially tangent to said hub and adapted to be ground off along a plane on the inner side of said jaw to produce a cutting edge of constant shape, said blades being so spaced circumferentially that the straight back of each arm is spaced from and substantially parallel to said end surface of the next one to permit the insertion of a sharpening stone between them.

In testimony whereof I have hereunto affixed my signature.

WILLIAM H. JONES.